United States Patent
Li

[11] Patent Number: 6,032,380
[45] Date of Patent: Mar. 7, 2000

[54] TAPE MEASURE STRUCTURE WITH IMPROVED BRAKE DEVICE

[76] Inventor: Shih Lin Li, No. 22, Lane 81, Sec. 2, Tunha S. Rd., Taipei, Taiwan

[21] Appl. No.: 09/020,314

[22] Filed: Feb. 9, 1998

[51] Int. Cl.⁷ .................................................. G01B 3/10
[52] U.S. Cl. ................................................ 33/767; 33/755
[58] Field of Search ........................... 33/767, 755, 759, 33/760, 761, 768, 769, 770; 242/381, 381.1, 381.2, 381.3, 381.6, 385, 385.4, 396, 396.1, 396.5, 410

[56] References Cited

U.S. PATENT DOCUMENTS

| | | | |
|---|---|---|---|
| 3,164,907 | 1/1965 | Quenot | 33/767 |
| 4,131,244 | 12/1978 | Quenot | 33/767 |
| 4,205,448 | 6/1980 | Asai | 33/767 |
| 4,903,912 | 2/1990 | Coughlin | 33/767 |
| 5,007,178 | 4/1991 | Dewire et al. | 33/767 |
| 5,210,956 | 5/1993 | Knispel et al. | 33/767 |
| 5,395,069 | 3/1995 | Chen | 33/767 |

*Primary Examiner*—Andrew H. Hirshfeld
*Attorney, Agent, or Firm*—Raymond Y. Chan; David and Raymond

[57] ABSTRACT

A tape measure structure includes a tape, an enclosure, and a brake device which further includes a release key and a first and second brake shoes. By means of the above combination, the retraction motion of the tape can be controlled by the user through simply pressing the release key with his finger. It means that the user may pull out the tape to approximately estimated length he desires for measurement without worrying about that tape might automatically bounce back. Then, afterwards, he may press lightly the release key for retracting the tape gradually and stop pressing the release key as soon as the tape reaches to the accurately desired length, the tape will be halted there by the control effect of the brake device.

3 Claims, 3 Drawing Sheets

TAPE MEASURE STRUCTURE WITH IMPROVED BRAKE DEVICE

BACKGROUND OF THE PRESENT INVENTION

1. Field of Invention

The present invention relates to a tape measure structure with improved brake device which can halt the extended tape according to the user's desired position during its retraction motion.

2. Description of Related Arts

A tape measure is frequently used in domestic and engineering application. In domestic application, it is useful for Do It Yourself (DIY) work in estimation of scale of house repairing work or painting walls and amount of related material required, or measurement of furniture size. It can also apply in professional works, such as surveying, measurement, estimation, and inspection for civil or architectural engineering. It is an urgent need for developing a tape measure which can be handled simply, securely and conveniently since a conventional tape measure contains the following common disadvantages:

1. The tape with resiliency is apt to bounce back abruptly with a large spring restoring force after being pulled out if it is failed to be fixed at once, and it often leads to a result of hurting the user himself or a third person staying nearby.
2. A high failure rate of the control device caused by frequent operation results in its poor durability and disturbing the user who to replace his tape measure from time to time.
3. As it has the weakpoint described in above item 1, a conventional tape measure is difficult to handle conveniently when it is used to measure several objects with different length successively. Once it cannot be halted at an exact position, the tape should be pulled out again from the beginning which results in very low efficiency of measurement.
4. The rapid withdrawing motion of a tape with a strong spring restoring force after measurement of an object is apt to hurt the user's finger by scraping with the tape edge. It may be the reason of why a tape measure is dangerous to be put without caution in the place that is easily to be reached by children.

SUMMARY OF THE PRESENT INVENTION

It is a first object of the present invention to provide a tape measure with a simple and compact structure which can be conveniently and surely handled.

It is a second object of the present invention to provide a tape measure with a simple structure that even a non-professional user can use it easily.

To achieve these and other objects, the tape measure of the present invention provides two brake shoes, i.e. an upper and a lower brake shoes for producing a constant braking effect, which can limit greatly the retraction force and speed of the tape so as to assure security of the user.

Moreover, as the user desires to halt the tape at a length approximately corresponding to the accurate length of the object to be measured, it is only necessary for the user to press lightly a release key provided on the brake device, and the tape will retract until the user stops pressing the release key to thereby halt the tape at the desired position.

Further to this, the design of accommodating all components in one half of the enclosure facilitates greatly reduces the assembly work of a tape measure, wherein control springs are reliably and stably settled and positioned therein.

In addition, the user may replace the spring installed on the brakes by himself to adjust the clamping force according to the actual requirement, or he may replace the old tape with a new one of different thickness that also results in varying the clamping effects to it.

BRIEF DESRIPTION OF THE DRAWINGS

The drawings disclose an illustrative embodiment of the present invention which serves to exemplify the various advantages and objects hereof, and are as follow:

| | |
|---|---|
| 1: enclosure | 11: stopper slot |
| 12: positioning slot | 2: tape |
| 3: release key | 31: V-shaped piece |
| 32: front flange | 4: first brake shoe |
| 40: second brake shoe | 41: first flange |
| 401: second flange | 402: second spring |
| 42 first spring | 43: control slot |

DETAILED DESCRIPTION OF THE PREFERRED EMBODIMENT

Figure 1:
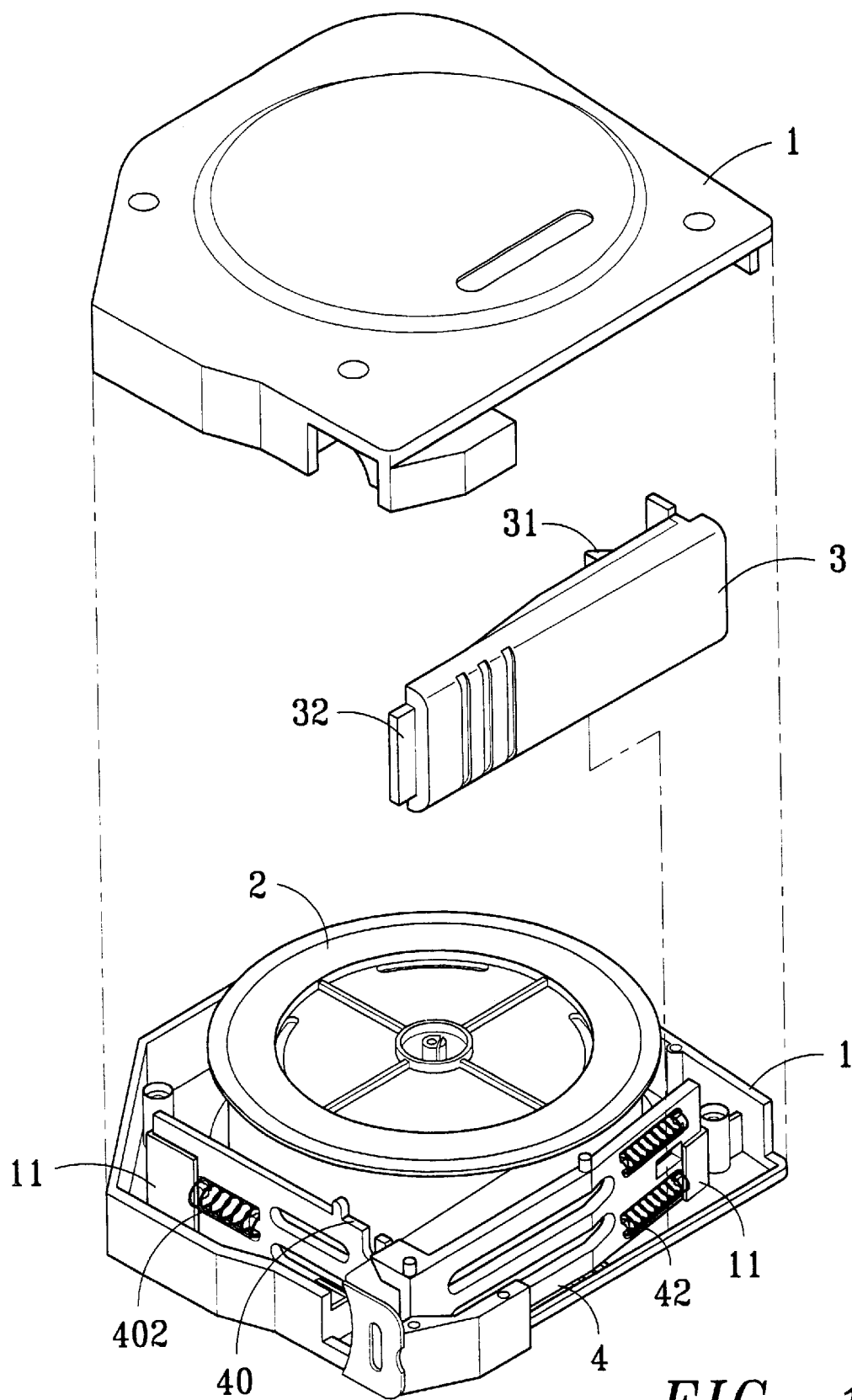
FIG. 1 is an exploded drawing for the structure of the tape measure of the present invention.
Figure 2:
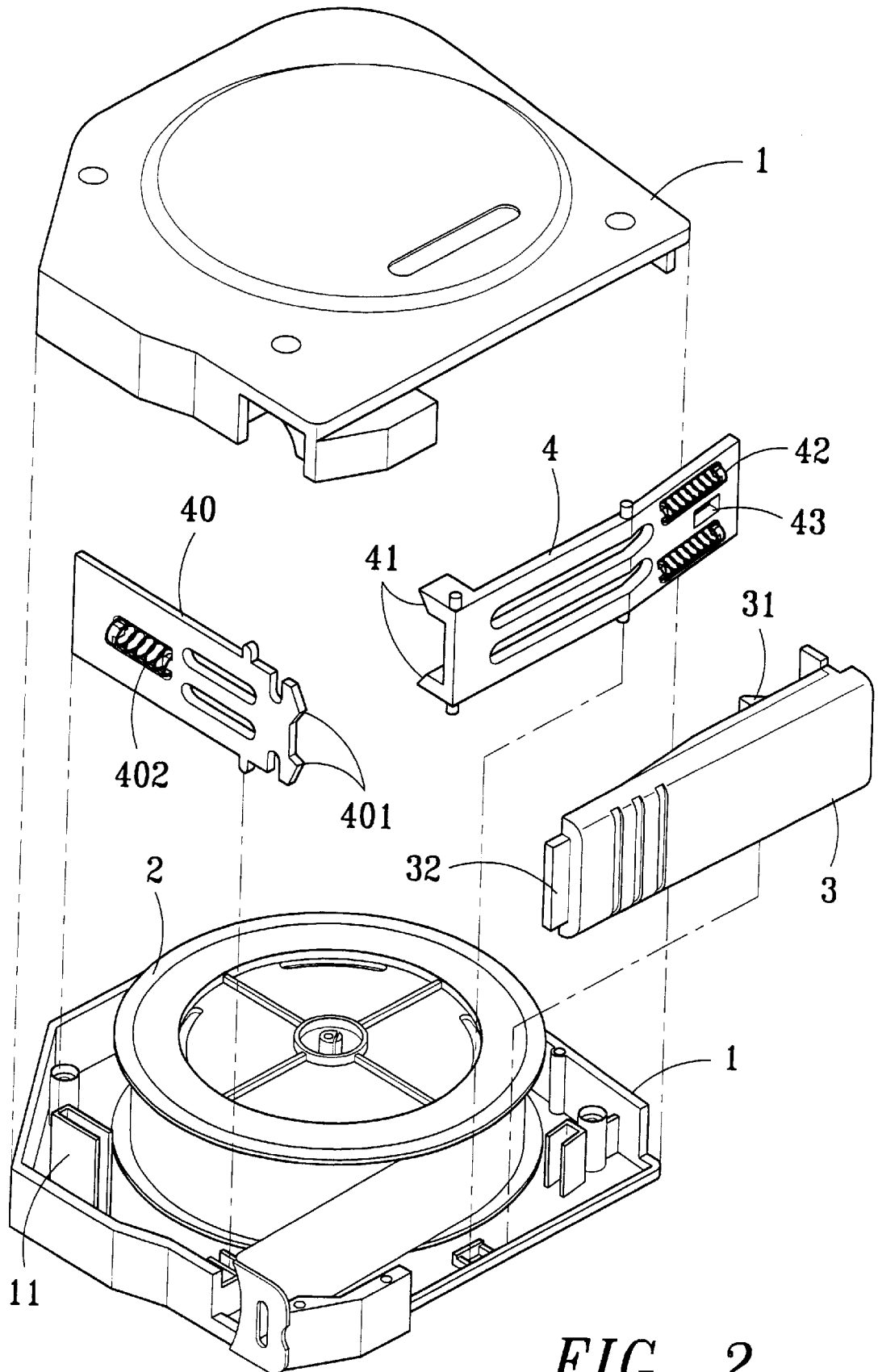
FIG. 2 is another exploded drawing for the structure of the tape measure of the present invention.

Referring to FIGS. 1 and 2, the tape measure comprises a tape 2, an enclosure 1 for accommodating the tape 2, and a brake device which includes a release key 3 and two brake shoes, wherein the two brake shoes include a first brake shoe 4 and a second brake shoe 40; the brake device can control the retraction motion of the tape 2 by pressing the release key 3 with a user's finger.

Figure 3:
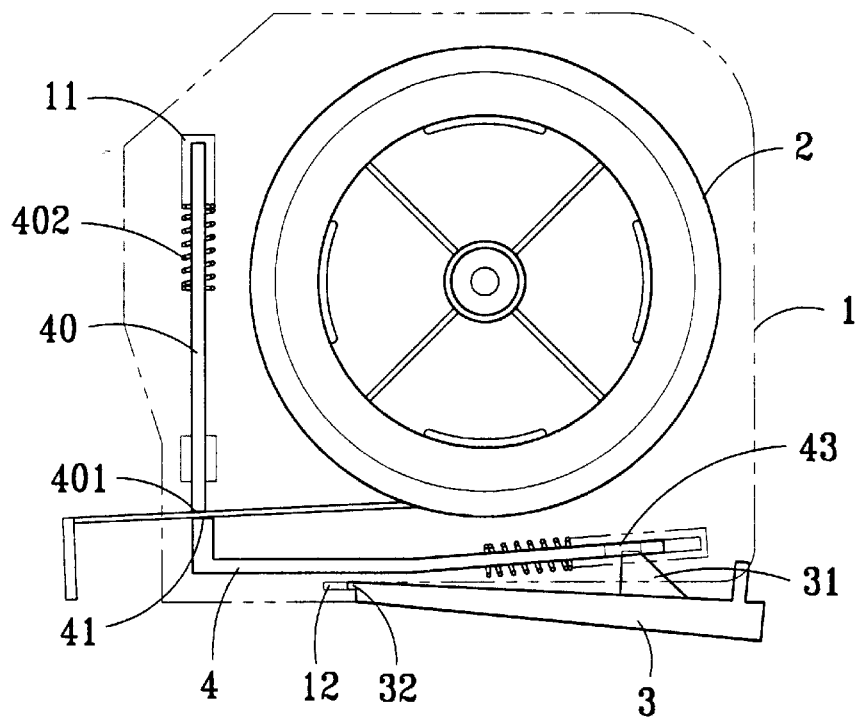
FIG. 3 is an exemplary drawing for the brake device of the tape measure of the present invention before actuation.
Figure 4:
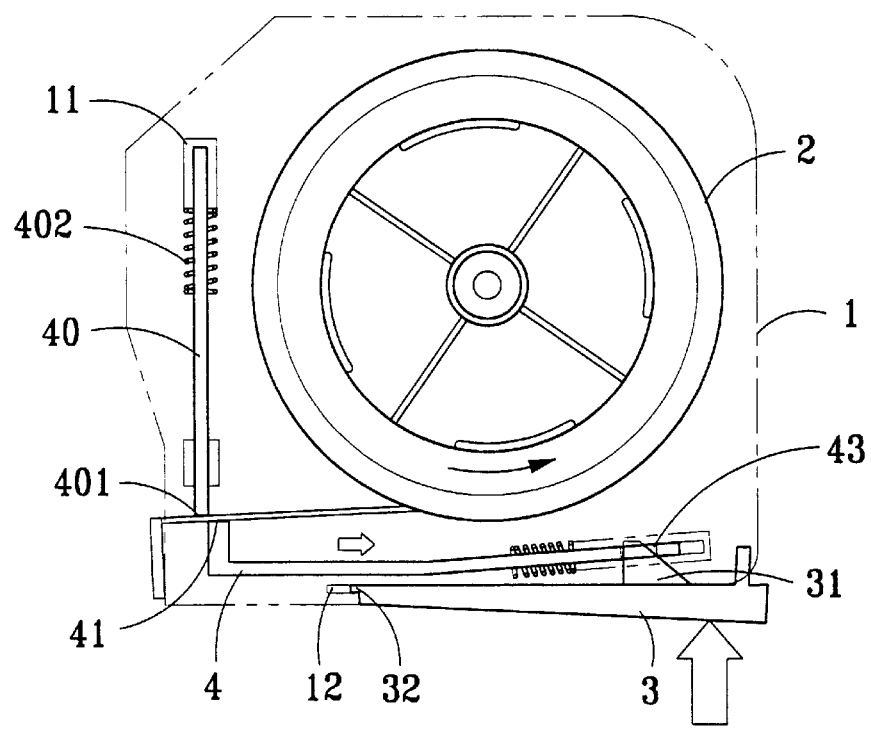
FIG. 4 is an exemplary drawing for the brake device of the tape measure of the present invention after actuation.

FIGS. 3 and 4 illustrate the brake device of the present invention before and after actuation respectively, wherein a substantially V-shaped piece 31 is protruded inwardly from the release key 3. The first brake shoe 4 has a tail end portion with a control slot 43 which is positioned under the release key 3, a front flange 32 of the release key 3 engages with a positioning slot 12 provided on the enclosure 1 of the tape measure functioning as a supporting point for the release key 3 when it is exerted by force.

There is a pair of first flanges 41 formed at a front end of the first brake shoe 4. The two first flanges 41 mutually and forcibly contact with a pair of second flanges 401 with the tape therebetween. A first spring 42 is provided at an end portion of the first brake shoe 4 and a second spring 402 is provided at an end portion of the second brake shoe 40. The first and second brake shoes 4 and 40 are respectively compressed and confined by two stopper slots 11 provided in the enclosure 1. The restoring force of the first and second springs 42 and 402 are imparted to the first and second flanges 41 and 401 of both the first and second brake shoes 4 and 40, so as to press the tape 2 sandwiched therebetween from two sides and halt it at the desired position. The braking function of the tape 2 is thus accomplished. At this time, the control slot 43 formed at a rear end portion of the first brake shoe 4 can accept a tip of the V-shaped piece 31 positioned substantially out of the control slot 43, as shown in FIG. 3.

When the tape measure is in use, pulling out the tape 2 at first, the tape 2 cannot retract automatically as it is under control of both the first and second brake shoes 4 and 40. If it is desired to reduce the length of the tape 2, the user may press the release key 3 with his finger to push the tip of the V-shaped piece 31 into the control slot 43 formed at the rear end portion of the first brake shoe 4 so as to force the first brake shoe 4 to retract backward as shown in FIG. 4. At this moment, the tape 2 is free to retract as both first and second brake shoes 4 and 40 have lost their control effect but the retraction motion of the tape 2 may be moderated since the first and second flanges 41 and 401 of both the first brake and second brake shoes 4 and 40 still retain slight contact with the tape 2. The purpose of assuring the user's security is thus attained.

When the user stops pressing the release key 3, the resiliency of the first and second springs 42 and 402 force the first and second flanges 41 and 401 of both the first and second brake shoes 4 and 40 to clamp the tape 2 in a sandwiched manner therebetween, so that the tape 2 cannot move. The braking of the tape 2 is thereby attained.

In the above described embodiment, the resilient force of the first and second springs 42 and 402 may be adjusted to a value according to the actual requirement of the force to pull out the tape 2 by replacing the first and second springs 42 and 402 with new ones having desired resiliency, and also the retraction force and speed are varied accordingly.

In addition, the tape 2 may be replaced with a new one of different thickness that also results in varying the clamping force to the tape 2.

Many changes and modifications in the above described embodiment of the invention can, of course, be carried out without departing from the scope thereof Accordingly, to promote the progress in science and the useful art, the invention is disclosed and is intended to be limited only by the scope of the appended claims.

I claim:

1. A tape measure structure, comprising:

an enclosure;

a tape which is accommodated in said enclosure; and a brake device which is accommodated inside said enclosure and further includes:

a release key having a substantially V-shaped piece protruding inwardly therefrom and a front flange formed at a front end thereof to engage with said enclosure for serving as a supporting point when a force is exerted on said release key; and a first brake shoe and a second brake shoe which are adapted for controlling a retraction motion of said tape by pressing said release key, wherein said first brake shoe has a control slot formed at a rear portion thereof and a pair of first flanges formed at a front end thereof, a pair of second flanges are formed at a front end of said second brake shoe, a first spring is provided at an end portion of said first brake shoe, and a second spring is provided at an end portion of said second brake shoe, wherein said pair of second flanges mutually and forcibly contact said first flanges with the tape therebetween, said first and second springs being respectively arranged to be compressed in said enclosure to impart said first and second brake shoes with restoring forces to compress said tape in a sandwiched manner between said first flanges and said second flanges of said first and second brake shoes to perform a braking effect while said first brake shoe is located under said release key with said V-shaped piece substantially out of said control slot;

said tape being capable of retracting under control of said first and second brake shoes upon pressing said release key to push a tip of said V-shaped piece into said control slot, said braking effect of said first and second brake shoes being released upon said V-shaped piece entering said slot and forcing said first brake shoe to move in a direction away from said second b rake shoe, said retraction motion of said tape being moderated since said first and second flanges of said first and second brake shoes retain slight contact with said tape during all movement of said first brake shoe.

2. A tape measure as recited in claim 1 wherein said first brake shoe and said first spring are aligned on a first force exerting line while said second brake shoe and said second spring are aligned on a second force exerting line.

3. A tape measure structure as recited in claim 1 wherein said release key actuates directly said first and second brake shoes in order to control said retraction motion of said tape.

* * * * *